United States Patent

Matsushima

[11] Patent Number: 5,831,957
[45] Date of Patent: Nov. 3, 1998

[54] CARTRIDGE ACCESS STATION FOR AN OPTICAL OR MAGNETIC DISK DRIVE

[75] Inventor: Takaaki Matsushima, Tokyo, Japan

[73] Assignee: NEC Corporation, Tokyo, Japan

[21] Appl. No.: 405,310

[22] Filed: Mar. 16, 1995

[30] Foreign Application Priority Data

Mar. 16, 1994 [JP] Japan ................................. 6-044503

[51] Int. Cl.⁶ .............................................. G11B 17/035
[52] U.S. Cl. ................................................... 369/77.2
[58] Field of Search .......................... 369/77.2, 77.1, 369/75.2, 291, 34, 36, 191, 192; 360/92, 93, 98.04, 98.06, 99.02, 99.03, 99.06, 99.07; 235/475, 479, 483, 485

[56] References Cited

U.S. PATENT DOCUMENTS

| | | | |
|---|---|---|---|
| 4,098,510 | 7/1978 | Suzuki et al. | 369/77.2 |
| 4,787,074 | 11/1988 | Deck et al. | 369/36 |
| 4,802,035 | 1/1989 | Ohtsuka | 360/92 |
| 4,871,905 | 10/1989 | Mita et al. | 235/475 |
| 4,907,098 | 3/1990 | Ohkoda et al. | 237/475 |
| 5,264,686 | 11/1993 | Kitahara | 235/483 |
| 5,264,688 | 11/1993 | Matsuno et al. | 235/475 |
| 5,300,763 | 4/1994 | Ito et al. | 235/475 |

*Primary Examiner*—Stuart S. Levy
*Assistant Examiner*—David D. Davis
*Attorney, Agent, or Firm*—Young & Thompson

[57] ABSTRACT

In an optical or magnetic disk drive, a cartridge access station (CAS) for moving a disk cartridge having a disk therein back and forth includes a belt which is driven by pulleys for conveying the cartridge. Stops for positioning the cartridge and a rubber or similar frictional conveying member are affixed to the outer periphery of the belt.

11 Claims, 5 Drawing Sheets

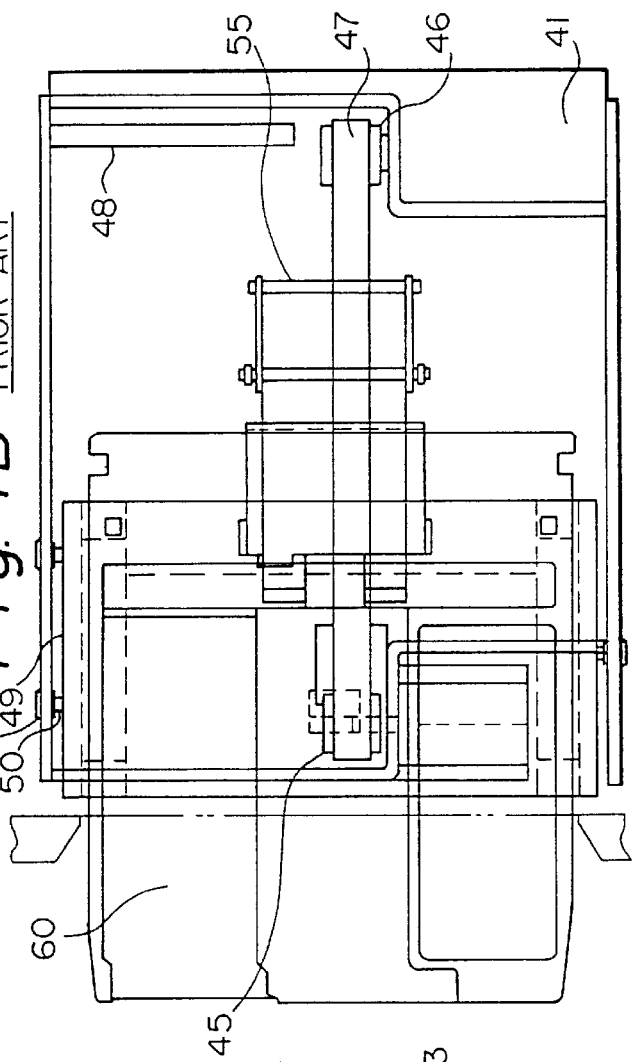
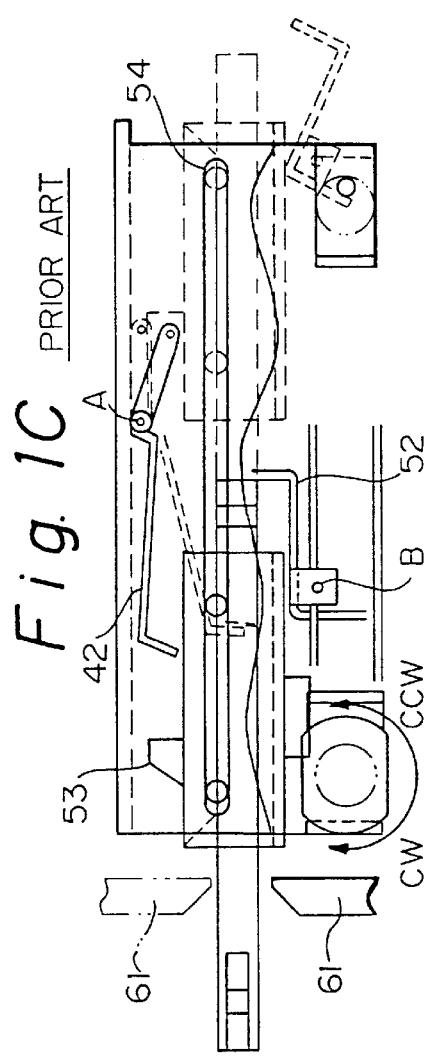
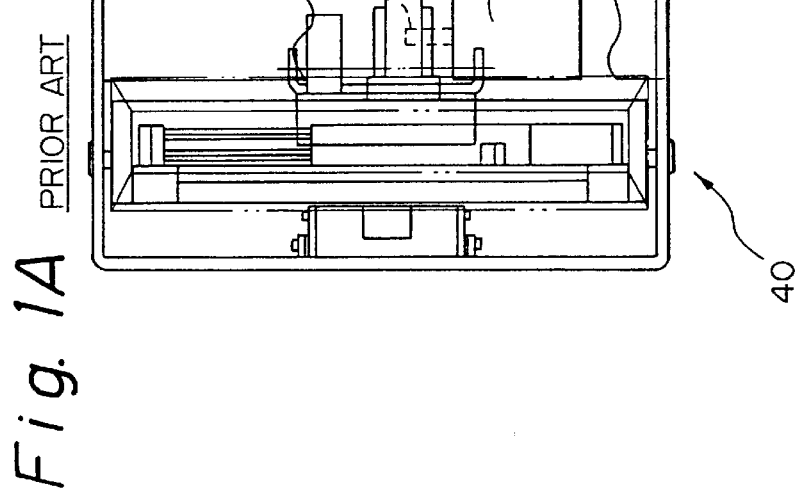

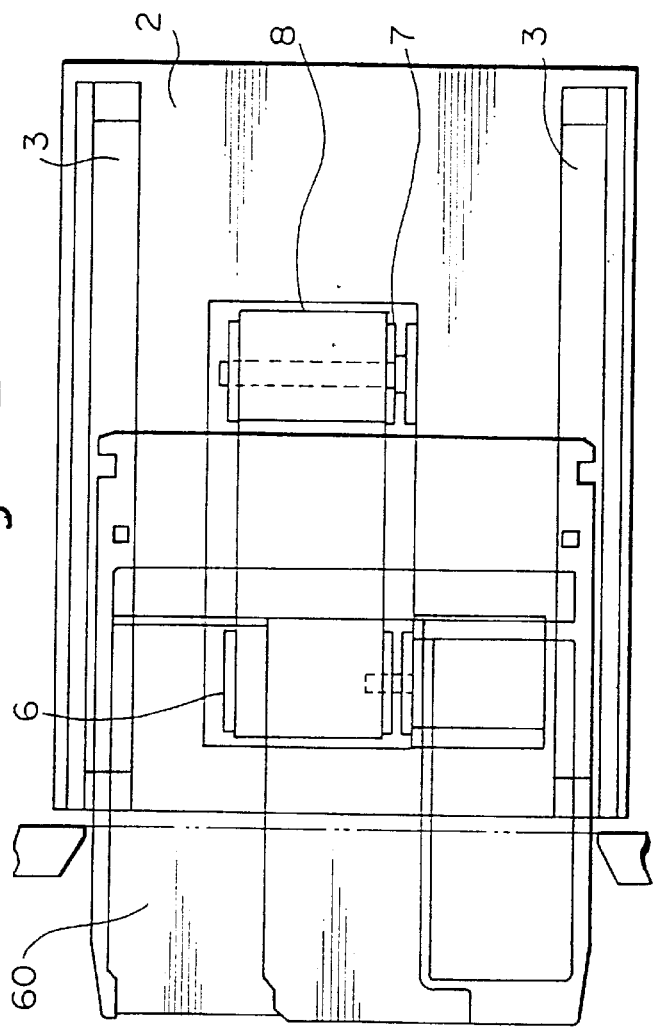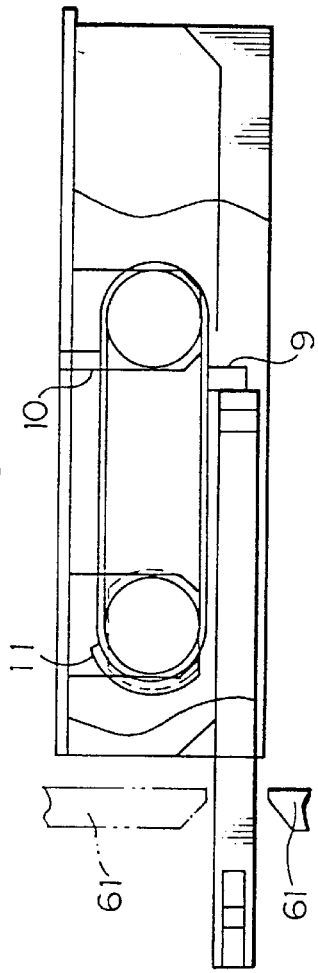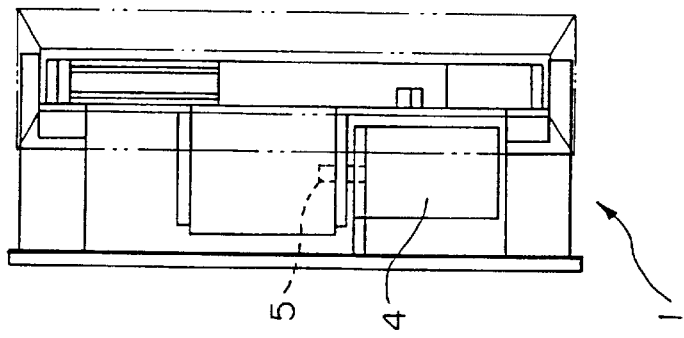

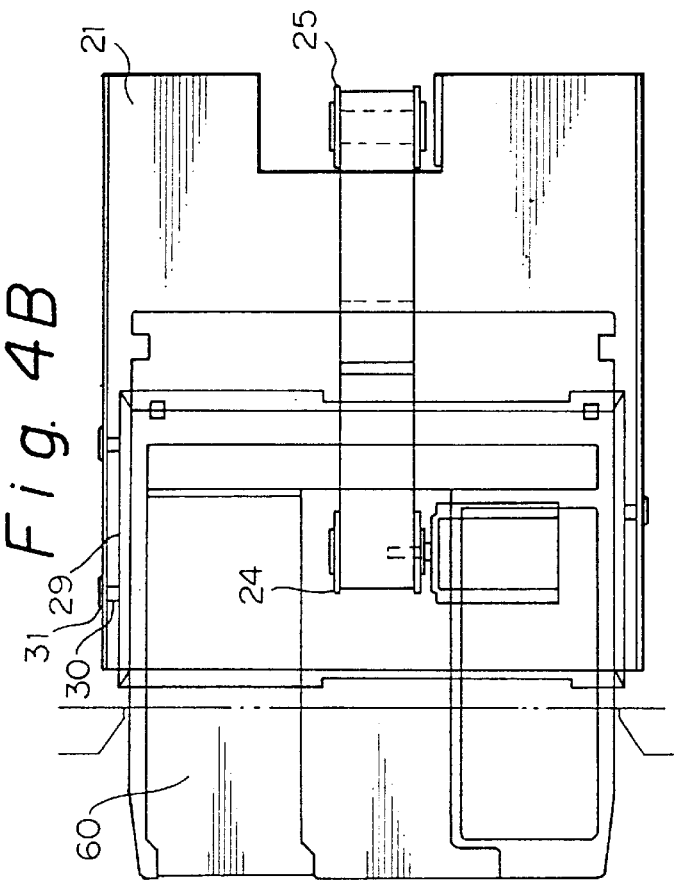
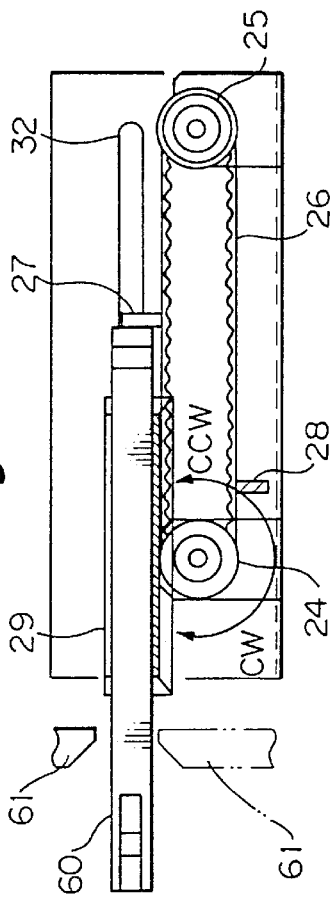
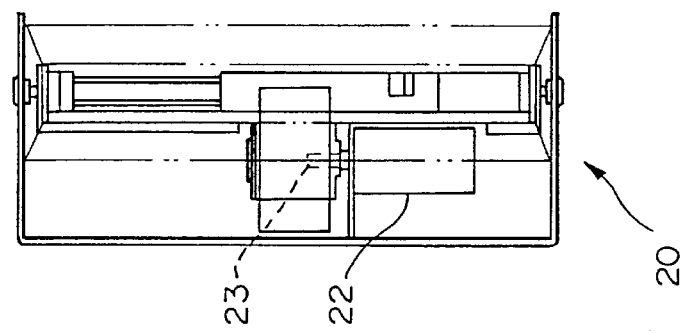

CARTRIDGE ACCESS STATION FOR AN OPTICAL OR MAGNETIC DISK DRIVE

BACKGROUND OF THE INVENTION

The present invention relates to an optical or magnetic disk drive and, more particularly, to a cartridge access station for moving a disk cartridge having a disk therein back and forth in a disk drive.

Today, an optical or magnetic disk drive is extensively used as a storage for various kinds of electronic equipment. A disk cartridge accommodating a disk or medium therein is used with such a disk drive in order store data. A cartridge access station, or CAS as it is often referred to, loads and unloads the disk drive with the disk cartridge inserted therein. The problem with a conventional CAS is that a great number of parts are combined in a complicated arrangement, and each needs high accuracy. Hence, the CAS is expensive in both the members aspect and the assembly aspect. Moreover, the CAS suffers from a lack of reliability due to the complicated movement.

OBJECTS OF THE INVENTION

It is, therefore, an object of the present invention to provide a CAS for an optical or magnetic disk drive and having a simple construction including a minimum number of parts and, therefore, being of minimum cost.

It is another object of the present invention to provide a CAS for an optical or magnetic disk drive which will be simple, stable and sure in operation.

SUMMARY OF THE INVENTION

A CAS for automatically loading and unloading from a disk drive a disk cartridge accommodating a disk therein of the present invention has a first pulley connected to the output shaft of a motor affixed to a base, a second pulley extending parallel to the first pulley, and a belt passed over the first pulley and second pulley and provided with stops for positioning the disk cartridge on the outer periphery thereof.

BRIEF DESCRIPTION OF THE DRAWINGS

The above and other objects, features and advantages of the present invention will become apparent from the following detailed description taken with the accompanying drawings in which:

FIGS. 1A, 1B and 1C are respectively a front view, a plan view and a side elevation showing a conventional CAS for an optical disk drive;

FIGS. 2A, 2B and 2C are respectively a front view, a plan view and a side elevation of a CAS embodying the present invention;

FIGS. 4A, 4B and 4C are respectively a front view, a plan view and a side elevation showing an alternative embodiment of the present invention.

DESCRIPTION OF THE PREFERRED EMBODIMENTS

Figure 3A:
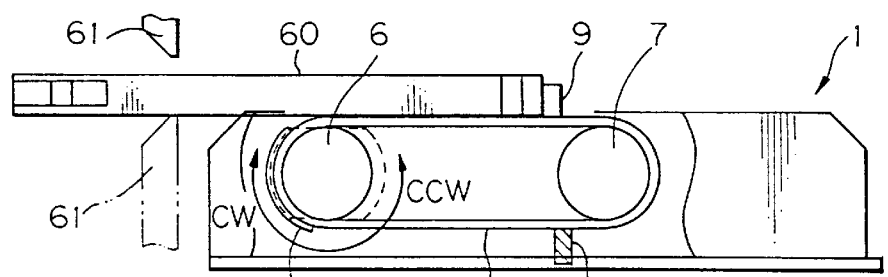
FIGS. 3A–3E are side elevations demonstrating a sequence of steps particular to the embodiment of FIGS. 2A 2B and 2C.

To better understand the present invention, a brief reference will be made to a conventional cartridge access station or CAS, shown in FIGS. 1A–1C. As shown, the CAS, generally 40, conveys an optical disk cartridge 60 accommodating a disk or medium therein into an optical disk drive via the front end thereof. The CAS 40 has a base frame 41 which is generally U-shaped and formed with elongate slots 54 in opposite side walls thereof. The base frame 41 supports various sections constituting the CAS 40. A cassette arm 42 is positioned below the base frame 41 and rotatable about a point A at the intermediate portion thereof. The cassette arm 42 has a rotary shaft 55 at one end and a positioning surface at the other end. The positioning surface is used to position the cartridge 60, as will be described later. A motor 43 is mounted on the base frame 41 at the lower front end of the CAS 40 and has an output shaft 44. A cylindrical pulley 45 is mounted on the output shaft 44 of the motor 45. A pulley 46 is positioned in parallel to the pulley 45. A timing belt 47 is passed over the pulleys 45 and 46. A cylindrical hook shaft 48 is affixed to the inner periphery of upper rear portion of the base frame 41. A carrier 49 has a square hollow configuration and has three retainer shafts 50, a cassette hook 52, and a trapezoidal block 53. The carrier 49 is affixed to the timing belt 47 at the upper end thereof. Three hollow bearings 51 are mounted on opposite sides of the carrier 49 and received in the slots 54 of the base frame 41. Retainer shafts 50 are each connected to one of the three bearings 51. The cassette hook 52 is located at the upper center of the carrier 49 and rotatable about a point B. The trapezoidal block 53 is positioned at the lower portion of the carrier 49.

In operation, the cartridge 60 is inserted into the carrier 49 via a front mask 61 positioned at the front end of the CAS 40. The cartridge 60 is positioned on the carrier 49 abutting against the cassette hook 52. Then, a power source connected to the motor 43 is turned on to rotate the motor 43 clockwise (CW, FIG. 1C). The motor 43, in turn, rotates the pulley 45 via the output shaft 44 thereof. As a result, the carrier 49 is moved rearward via the timing belt 47, conveying the cartridge 60 deep into the CAS 40. Immediately before the end of conveyance, the hook 52 abuts the hook shaft 48 and rotates about the point B. Consequently, the portion of the hook 52 contacting the cartridge 60 rises and renders the cartridge 60 ready to be transferred to the disk drive. At the same time, the shaft of the cassette arm 42 is urged and rotated by the block 53 with the result that the portion of the arm 42 contacting the cartridge 60 is lowered. In this condition, the arm 42 prevents the cartridge 60 from moving toward the front end of the CAS 40. To eject the cartridge 60, the motor 43 is rotated counterclockwise (CCW, FIG. 1C) to cause the various constituents to move in the opposite way.

The conventional CAS 40, however, has a problem that a great number of parts are combined in a complicated arrangement, and each needs high accuracy, as stated earlier. Hence, the CAS 40 is expensive in both the members aspect and the assembly aspect. Moreover, the CAS 40 suffers from a lack in reliability due to the complicated movement.

Referring to FIGS. 2A–2C and 3A–3E, a CAS embodying the present invention is shown and generally designated by the reference numeral 1. As shown in FIGS. 2A–2C, a base 2 is positioned at the bottom of the CAS 1 and supports the entire CAS assembly. A motor 4 is mounted on the intermediate portion of the base 2 in an orientation perpendicular to a loading and unloading direction of a disk cartridge. A pulley 6 is connected to the output shaft 5 of the motor 4. A pulley 7 is positioned in parallel to the pulley 6. A belt 8 is passed over the pulleys 6 and 7. Stops 9 and 10 are affixed to the outer periphery of the belt 8. A rubber member 11 is also affixed to the outer periphery of the belt 8 and is engageable with a disk cartridge 60. A cassette block 3 is mounted on each side wall of the base 2 in order to support the cartridge 60.

Figure 3B:
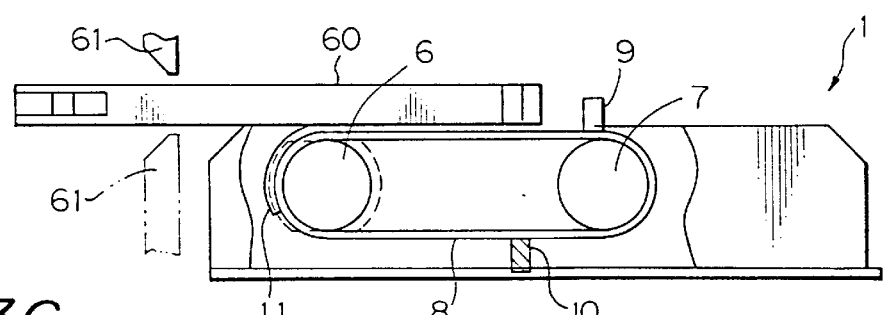
Figure 3C:
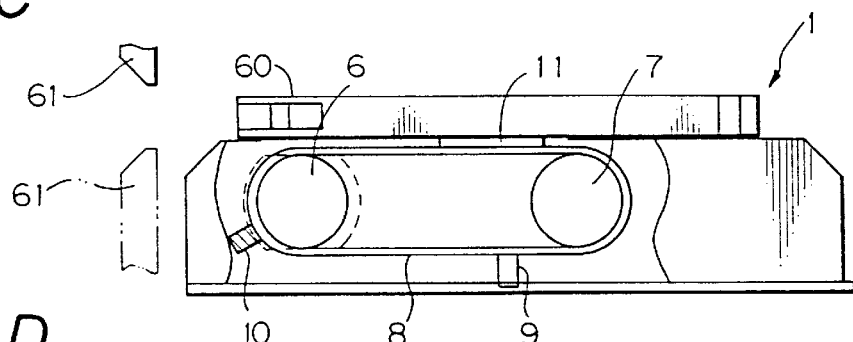
Figure 3D:
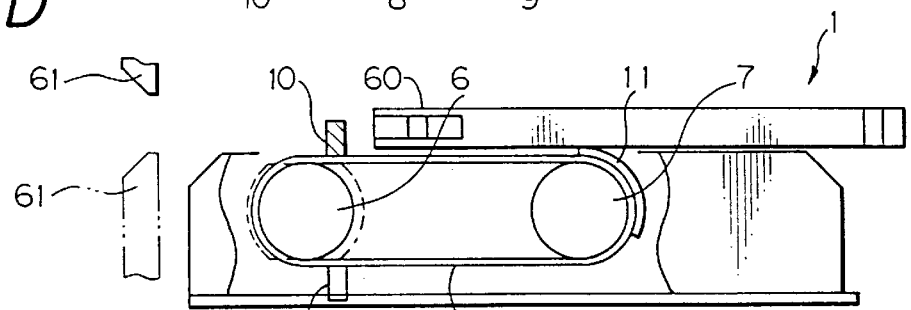
Figure 3E:
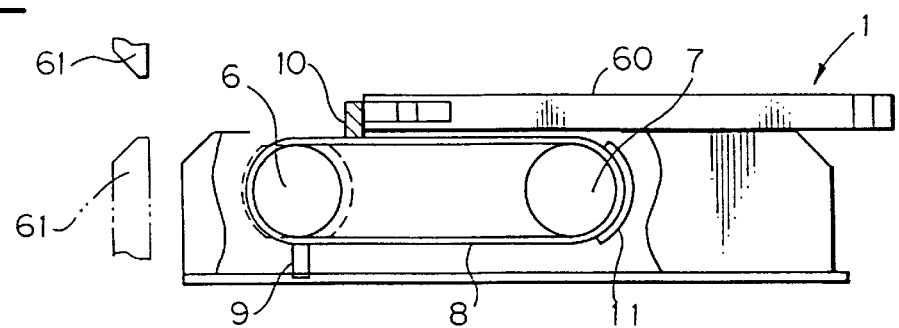

A reference will be made to FIGS. 3A–3E for describing how the CAS 1 loads and unloads the disk cartridge 60. The cartridge 60 is inserted into the CAS 1 via a front mask 61 provided at the front of the CAS 1. The cartridge 60 is positioned abutting the stop 9 of the belt 8, as shown in FIG. 3A. When a power source connected to the motor 4 is turned on to rotate it clockwise (CW), the pulley 6 is rotated by the motor output shaft 5. As a result, the belt 8 and, therefore, the rubber member 11 and stops 9 and 10 affixed thereto are moved. First, the rubber member 11 is brought into contact with the cartridge 60, as shown in FIG. 3B. The rubber member 11 is moved deep into the CAS 1 while slightly raising the cartridge 60. At this instant, the stop 9 is moved along the curvature of the pulley 7 away from the path on which the cartridge 60 moves, as shown in FIG. 3C. Immediately before the end of conveyance, the rubber member 11 is released from the cartridge 60, as shown in FIG. 3D. Finally, the stop 10 abuts and positions the cartridge 60, as shown in FIG. 3E. At the same time, the stop 10 prevents the cartridge 60 from moving toward the front end of the CAS 1. To eject the cartridge 60, the motor 4 is rotated counterclockwise (CCW) to move the various constituents of the CAS 1 in the opposite way.

Referring to FIGS. 4A–4C and 5A–5D, an alternative embodiment of the present invention will be described. As shown in FIGS. 4A–4C, a CAS, generally 20, includes a base frame 21 having an open-top generally U-shaped configuration and formed with elongate slots 32 in opposite side walls thereof. The base frame 21 supports the entire CAS assembly. A motor 22 is affixed to the intermediate portion of the base frame 21 in an orientation perpendicular to the loading and unloading direction of the cartridge 60. A pulley 24 is connected to the output shaft 23 of the motor 22. A pulley 25 is positioned in parallel to the pulley 24. A belt 26 is passed over the pulleys 24 and 25 while stops 27 and 28 are affixed to the outer periphery of the belt 26. An open-top generally U-shaped carrier 29 has three bearings 31 and three retainer shafts 30 and is affixed to the belt 26 at the lower side thereof. The bearings 31 are mounted on opposite side walls of the carrier 29 and received in the slots 32 of the base frame 21. The retainer shafts 30 are each connected to one of the bearings 31.

Figure 5A:
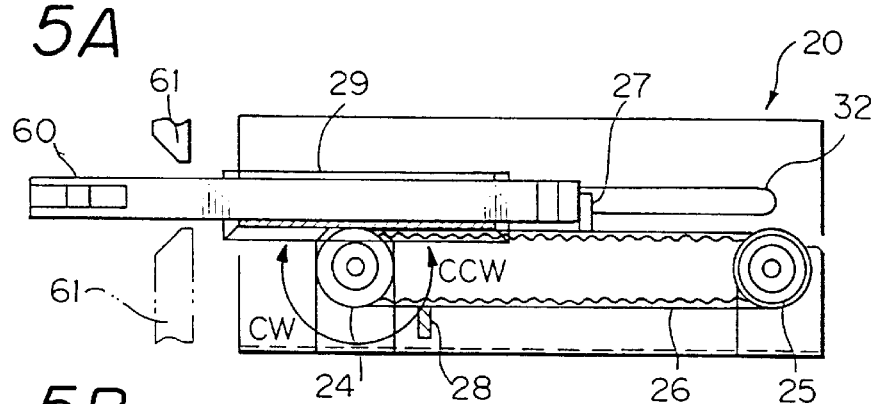
FIGS. 5A–5D are side elevations demonstrating a sequence of steps particular to the alternative embodiment.
Figure 5B:
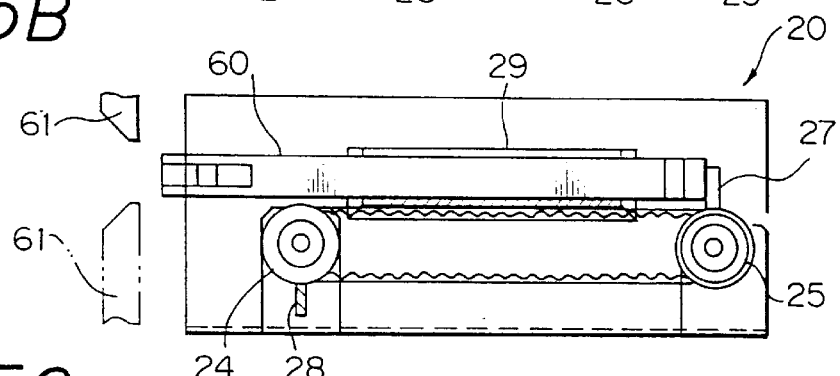
Figure 5C:
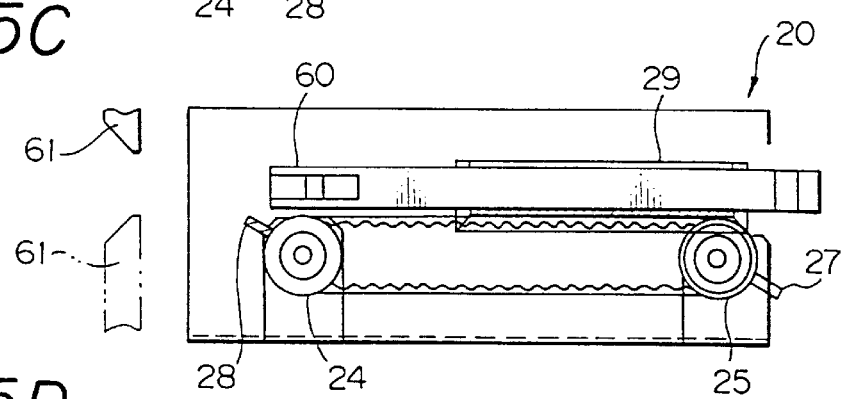
Figure 5D:
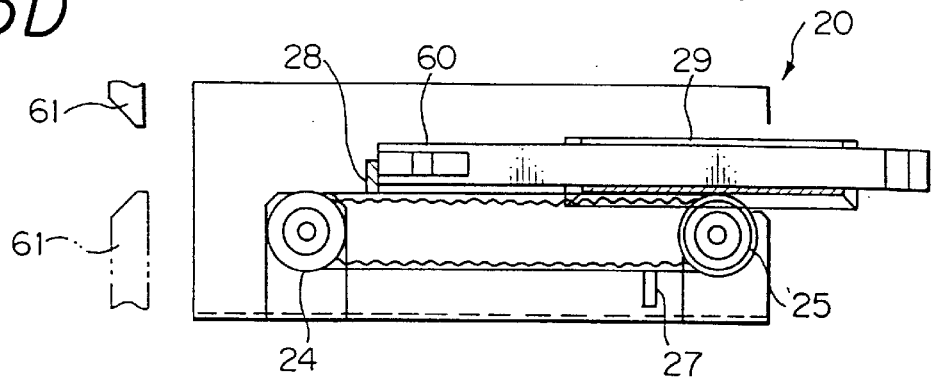

How the CAS 20 loads and unloads the cartridge 60 will be described with reference to FIGS. 5A–5D. The cartridge 60 is inserted into the CAS 20 via the front mask 61 provided at the front of the CAS 20. The cartridge 60 is positioned abutting the stop 27 of the belt 26 as shown in FIG. 5A. When a power source connected to the motor 22 is turned on to rotate it clockwise (CW), the pulley 24 is rotated by the motor output shaft 23. As a result, the carrier 29 connected to the stops 27 and 28 via the belt 26 is moved. The cartridge 60 loaded on the carrier 29 is moved integrally with the carrier 29, as shown in FIG. 5B. As the belt 26 is further moved, the stop 27 is moved along the curvature of the pulley 25 away from the path assigned to the cartridge 60, as shown in FIG. 5C. Finally, the stop 28 abuts and positions the cartridge 60, as shown in FIG. 5D. At the same time, the stop 28 prevents the cartridge 60 from moving toward the front end of the CAS 20. To eject the cartridge 60, the motor 22 is rotated counterclockwise (CCW) to cause the constituent parts to move in the opposite way.

In summary, it will be seen that the present invention provides a CAS which is simplified in construction while preserving the expected function. The simple construction reduces the number of constituent parts and, therefore, the costs of parts and assembly. In addition, the operation is simplified to enhance reliability. These advantages are derived from stops and a rubber or similar conveying member provided on the outer periphery of a belt.

Various modifications will become possible for those skilled in the art after receiving the teachings of the present disclosure without departing from the scope thereof.

What is claimed is:

1. A cartridge access station (CAS) for automatically loading and unloading from a disk drive a disk cartridge accommodating a disk therein, comprising:

a first pulley rotatable about a horizontal axis and connected to an output shaft of a motor affixed to a base;

a second pulley extending parallel to said first pulley; and a belt having superposed horizontal upper and lower runs passing over said first pulley and said second pulley and provided with stops for positioning the disk cartridge on an outer periphery thereof, a first of said stops being positioned on said belt so as to block seating of the disk cartridge in the disk drive when said belt is stationary in a first orientation, and a second of said stops being positioned on said belt so as to seat the disk cartridge in the disk drive when said belt is moving in a first direction and so as to hold the disk cartridge in the disk drive when said belt has stopped moving in the first direction and is stationary in a second orientation.

2. A CAS as claimed in claim 1, further comprising cassette blocks located at opposite sides of said base and for supporting the disk cartridge in cooperation, and a frictional conveying member affixed to the outer periphery of said belt and engageable with said disk cartridge.

3. A CAS as claimed in claim 1, further comprising a carrier having an open-top generally U-shaped configuration, and supported by said base in such a manner as to be movable in a front-and-rear direction of said CAS, and affixed to said belt.

4. The CAS of claim 1, wherein said first stop is positioned on said belt so as to avoid contact with the disk cartridge when said belt is moving in the first direction.

5. The CAS of claim 1, wherein said second stop is positioned on said belt so as to avoid contact with the disk cartridge when said belt is moving in a second direction opposite the first direction.

6. The CAS of claim 1, wherein said belt further comprises a frictional conveying member on the outer periphery thereof between said first and second stops in the first direction.

7. The CAS of claim 6, wherein said frictional conveying member has a thickness for lifting the disk cartridge off of said belt.

8. The CAS of claim 6, wherein said belt lacks means for frictional conveyance of the disk cartridge on the outer periphery thereof between said first and second stops in a second direction opposite the first direction.

9. A method of automatically loading and unloading a disk cartridge from a disk drive, comprising the loading steps of:

placing a disk cartridge onto an endless conveyor belt in a receiving slot in a disk drive in a cartridge access station (CAS) so that an inserted end of the disk cartridge abuts a first stop on the belt that blocks seating of the disk cartridge in the disk drive;

rotating the belt in a first direction to frictionally impel the disk cartridge toward a seated position in the disk drive, rotation of the belt moving the first stop ahead of the inserted end of the disk cartridge and out of a travel path of the disk cartridge;

continuing rotation of the belt until a second stop on the belt abuts an opposite end of the disk cartridge and impels the disk cartridge into the seated position in the disk drive; and holding the disk cartridge in the seated position with the second stop.

10. The method of claim 9, further comprising the unloading steps of:

rotating the belt in a second direction opposite the first direction to frictionally impel the disk cartridge out of the seated position, rotation of the belt moving the second stop ahead of the opposite end of the disk cartridge and out of a travel path of the disk cartridge;

continuing rotation of the belt until the first stop abuts the inserted end of the disk cartridge; and removing the disk cartridge from the CAS.

11. The method of claim 9, wherein the rotation step impels the disk cartridge with a frictional conveying member on the outer periphery of the belt between the first and second stops in the first direction.

* * * * *